US008168276B2

(12) United States Patent  
Cleaver et al.

(10) Patent No.: US 8,168,276 B2  
(45) Date of Patent: May 1, 2012

(54) FOOD AND BEVERAGE CONTAINERS AND METHODS OF COATING

(75) Inventors: Michael Cleaver, Tournus (FR); Sebastien Gibanel, Chalon sur Saone (FR); Georges Sion, Mancey (FR); Benoit Prouvost, L'Abergement de Cuisery (FR); Dave Pape, Tarporly (GB); Paul Stenson, Gattikon (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 214 days.

(21) Appl. No.: 12/438,324

(22) PCT Filed: Sep. 18, 2007

(86) PCT No.: PCT/US2007/078728
§ 371 (c)(1),
(2), (4) Date: May 26, 2010

(87) PCT Pub. No.: WO2008/036629
PCT Pub. Date: Mar. 27, 2008

(65) Prior Publication Data
US 2010/0243506 A1    Sep. 30, 2010

Related U.S. Application Data

(60) Provisional application No. 60/826,108, filed on Sep. 19, 2006.

(51) Int. Cl.
*B29D 22/00* (2006.01)
*B29D 23/00* (2006.01)
*B32B 1/08* (2006.01)
*B32B 15/08* (2006.01)

(52) U.S. Cl. ............ 428/35.8; 428/35.7; 428/36.9; 428/36.91; 428/480; 428/482; 427/402; 427/409; 427/410

(58) Field of Classification Search ............... 428/35.7, 428/35.8, 36.9, 36.91, 480, 482; 427/402, 427/409, 410
See application file for complete search history.

(56) References Cited

U.S. PATENT DOCUMENTS

| 4,113,757 A | 9/1978 | Kay |
| 4,444,957 A | 4/1984 | Keogh |
| 4,507,339 A | 3/1985 | Carbo et al. |
| 4,966,948 A | 10/1990 | Godbey, Jr. et al. |
| 5,211,881 A | 5/1993 | Muller et al. |
| 5,373,045 A | 12/1994 | Smith et al. |
| 5,582,319 A | 12/1996 | Heyes et al. |
| 5,830,952 A | 11/1998 | Pedersen et al. |
| 6,737,485 B1 | 5/2004 | St. Clair et al. |
| 2003/0059561 A1 | 3/2003 | Ueda et al. |

(Continued)

FOREIGN PATENT DOCUMENTS
EP    0021602 B1    3/1984
(Continued)

OTHER PUBLICATIONS

Abstract Bulletin of the Institute of Paper Chemistry. Jul. 1988-Jun. 1989. vol. 59. Copyright 1989 The Institute of Paper Chemistry. Copyright Page, p. 660. (2 pages).

(Continued)

*Primary Examiner* — Michael C Miggins (57) ABSTRACT

Food and beverage containers and methods of coating are provided. The food and beverage containers include a metal substrate that is at least partially coated with a coating prepared from a composition that includes a resin system, a crosslinker, and a catalyst. Preferably, the coating composition is substantially Bisphenol A-free.

20 Claims, 5 Drawing Sheets

U.S. PATENT DOCUMENTS

| | | |
|---|---|---|
| 2003/0172998 A1 | 9/2003 | Wojcik et al. |
| 2005/0249879 A1 | 11/2005 | Jenkins et al. |
| 2006/0135678 A1 | 6/2006 | Kato et al. |

FOREIGN PATENT DOCUMENTS

| | | |
|---|---|---|
| GB | 1479638 | 7/1977 |
| GB | 1514361 | 6/1978 |
| GB | 2053285 A | 2/1981 |
| JP | 55033741 | 3/1980 |
| JP | 62253674 | 11/1987 |
| JP | 2107678 | 4/1990 |
| JP | 2202967 | 8/1990 |
| WO | 9317864 A1 | 9/1993 |
| WO | 02060700 A2 | 8/2002 |
| WO | 2005080517 A1 | 9/2005 |

OTHER PUBLICATIONS

"Bacote 20®—The Alkaline Crosslinker for Paper and Paperboard," Data Sheet 102. (2 pages).

"Bacote 20®," Data Sheet 326. Undated. (1 page).

Brewis, et al., "The Effect of Zirconium Compounds on the Wet Scrub-Resistance of Emulsion Polymer Films," 1993. Surface Coatings International, Title Page, Contents Page, pp. 418, 420-422. (6 pages).

Comyn, "Zirconium Compounds in Adhesion and Abhesion," 1994. Int. J. Adhesion and Adhesives, vol. 14, No. 2, Title Page, Contents Pages, pp. 109-115. (10 pages).

"DuPont™ Tyzor® Organic Titanates," General Brochure. Copyright 2001 E.I du Pont de Nemours and Company. (11 pages).

"DuPont™ Tyzor® Organic Titanates," Technical Note—FDA—Indirect Food Contact. Copyright 2001 E.I. du Pont de Nemours and Company. (1 page).

"DuPont™Tyzor® Organic Titanates," Product Information—Tyzor® LA. Copyright 2001 E.I. du Pont de Nemours and Company. (2 pages).

Moles. "The Use of Zirconium in Surface Coatings," Data Sheet 117. Undated. (6 pages).

Moles, et al. "The Use of Zirconium Compounds in Water-Based Coatings," 1984. Polymers Paint Colour Journal. vol. 174, No. 4122. Title Page, Contents Page, pp. 440-441. (4 pages).

Moles. "The Use of Zirconium in Surface Coatings," 1985. Polymers Paint Colour Journal. vol. 175, No. 4146. Title Page, pp. 447-448, 450-, 452. (5 pages).

Moles. "Promoting Adhesion with Zirconium Compounds," 1987. Ink and Print. vol. 6, No. 1. Contents Page, pp. 26-28. (4 pages).

Moles. "Zirconium Compounds as Surface Coatings Additives," 1988. Paint and Resin. vol. 58, No. 2, ISSN 0261-5747. Contents Page, pp. 15-17. (4 pages).

Moles. "The Crosslinking of Emulsion Polymers with Zirconium Chemicals," 1989. Journal of the Oil and Color Chemists' Association (JOCCA). vol. 7, No. 8, Aug. 1989. Title Page, Contents Page, pp. 301, 303. (4 pages).

International Search Report and Written Opinion for PCT/US2007/078728 dated Mar. 25, 2008. (10 pages).

The lacquered metal test piece is 12.5 cm in length and 5 cm wide.
This is bent 180° by using a mandrel in Fig. 3.

FIG. 3

Wedge Bend Test Piece and Apparatus.

FIG. 4

Diagram of Bending Apparatus

FIG. 5

FOOD AND BEVERAGE CONTAINERS AND METHODS OF COATING

CROSS REFERENCE TO RELATED APPLICATION

This application is the National Stage filing under 35 U.S.C. 371 of International Application No. PCT/US2007/078728 filed on Sep. 18, 2007, which claims the benefit of Provisional Application No. 60/826,108 filed on Sep. 19, 2006 by Cleaver et. al., and entitled "Food and Beverage Containers and Methods of Coating," both of which are incorporated herein by reference in their entirety.

BACKGROUND

A wide variety of coatings have been used to coat the surfaces of packaging articles (e.g., food and beverage containers). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured in an oven). The coated substrate then is formed into a can end or body. Alternatively, liquid coating compositions may be applied (e.g., by spraying, dipping, rolling, etc.) to the formed article and then hardened (e.g., cured in an oven).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Many current packaging coatings suffer from one or more performance defects and/or contain extractable quantities of one or more undesirable compounds.

From the foregoing, it will be appreciated that what is needed in the art is a packaging container (e.g., a food or beverage container), particularly one that is coated with a composition that does not contain extractable quantities of undesirable compounds.

SUMMARY

The present invention provides a food and beverage container that includes a metal substrate that is at least partially coated with a coating prepared from a composition that includes a resin system, a crosslinker, and a catalyst.

In one embodiment, a food or beverage container is provided. The food or beverage container includes a metal substrate, wherein at least a portion of the metal substrate is coated with a coating prepared from a composition including: a resin system including carboxylic groups, hydroxyl groups, or combinations thereof; a crosslinker selected from the group consisting of a phenolic crosslinker, an amino crosslinker, and combinations thereof; and a catalyst selected from the group consisting of a titanium-containing catalyst, a zirconium-containing catalyst, and combinations thereof. Preferably, the composition is substantially Bisphenol A-free.

The metal substrate is preferably steel or aluminum. The resin system includes, preferably, a polyester resin, an acrylate resin, a grafted polyester-acrylate resin, or combinations thereof. Preferably, the resin system is a water-soluble or water-dispersible system.

In another embodiment, the present invention provides a food or beverage container including a metal substrate, wherein at least a portion of the metal substrate is coated with a coating prepared from a composition including: a resin system including a polyester resin and an acrylate resin; a crosslinker selected from the group consisting of a phenolic crosslinker, an amino crosslinker, and combinations thereof; and a catalyst selected from the group consisting of a titanium-containing catalyst, a zirconium-containing catalyst, and combinations thereof.

In another embodiment, the present invention provides a food or beverage container including a metal substrate, wherein at least a portion of the metal substrate is coated with a coating prepared from a composition including: a resin system including oxirane groups and optionally carboxylic groups, hydroxyl groups, or combinations thereof; a crosslinker selected from the group consisting of a phenolic crosslinker, an amino crosslinker, and combinations thereof; and a catalyst selected from the group consisting of a titanium-containing catalyst, a zirconium-containing catalyst, and combinations thereof.

In certain embodiments, the resin system includes a polyester resin. In certain embodiments, the polyester resin is a reaction product of components that include a polybasic acid containing at least two carboxyl groups and a polyhydric alcohol containing at least two hydroxyl groups. Preferably, the polyester resin is a reaction product of components that include propylene glycol, trimethylol propane, terephthalic acid, isophthalic acid, and maleic anhydride.

In certain embodiments, the resin system includes an acrylate resin. In certain embodiments, the acrylate resin is a reaction product of components that include a (meth)acrylic acid ester, an ethylenically unsaturated mono- or multi-functional acid, and an optional vinyl compound. Preferably, the acrylate resin is a reaction product of components that include ethyl acrylate, acrylic acid, and styrene.

In certain embodiments, the crosslinker includes a phenolic crosslinker. In certain embodiments, the phenolic crosslinker includes a phenolic resin which is a reaction product of components that include a phenolic compound and formaldehyde. Preferably, the phenolic crosslinker has a weight average molecular weight of 800 to 8,000. More preferably, the phenolic crosslinker has a weight average molecular weight of 1,200 to 5,000.

In certain embodiments, the phenolic compound used to make the phenolic crosslinker is selected from the group consisting of phenol, cresol, p-phenylphenol, p-tert-butylphenol, p-tert-amylphenol, cyclopentylphenol, cresylic acid, bisphenol A, and combinations thereof. In certain embodiments, the phenolic compound used to make the phenolic crosslinker is selected from the group consisting of phenol, cresol, p-phenylphenol, p-tert-butylphenol, p-tert-amylphenol, cyclopentylphenol, cresylic acid, and combinations thereof. Preferably, the phenolic compound is phenol.

In certain embodiments, the crosslinker includes an amino crosslinker. In certain embodiments, the amino crosslinker is selected from the group consisting of aminoplasts. Preferably, the aminoplast is selected from the group consisting of benzoguanamine-formaldehyde resins, melamine-formaldehyde resins, esterified melamine-formaldehyde resins, glycoluril-formaldehyde resins, urea-formaldehyde resins, and combinations thereof. More preferably, the aminoplast is a fully methylated hexamethoxymethyl melamine resin.

In certain embodiments, the catalyst is a titanium-containing catalyst. In certain embodiments, the titanium-containing catalyst is selected from the group consisting of titanium acetylacetonate, tetraalkyltitanates, isopropylorthotitanate, water soluble titanium chelated salts, triethanolamine chelates of titanium, tetratriethanolamine chelates of titanium, diammonium dihydroxybis[lactato(2)-$O_1O_2$]titanate(2-), and combinations thereof. Preferably, the titanium-containing catalyst is diammonium dihydroxybis[lactato(2)-$O_1O_2$] titanate(2-).

In certain embodiments, the catalyst is a zirconium-containing catalyst. In certain embodiments, the zirconium-containing catalyst is selected from the group consisting of zirconium propionate, zirconium acetate, ammonium zirconyl carbonate, zirconate (2)-bis[carbonato(2)-O]dihydroxy-diammonium, zirconium chelated salts, sodium zirconium lactate, sodium zirconium glycolate, tetrakis [[2,2',2"-nitrilotris (ethanolato)](1)-N,O]zirconium, and combinations thereof. More preferably, the zirconium-containing catalyst is ammonium zirconyl carbonate.

In certain embodiments, the composition further includes fillers, dyes, pigments, toners, extenders, lubricants, anticorrosion agents, flow control agents, thixotropic agents, dispersing agents, antioxidants, adhesion promoters, light stabilizers, organic solvents, surfactants, or combinations thereof.

Methods of coating a food or beverage container are also provided.

In one embodiment, the method includes: forming a composition including: a resin system including carboxylic groups, hydroxyl groups, or combinations thereof; a crosslinker selected from the group consisting of a phenolic crosslinker, an amino crosslinker, and combinations thereof; and a catalyst selected from the group consisting of a titanium-containing catalyst, a zirconium-containing catalyst, and combinations thereof; wherein the composition is substantially Bisphenol A-free; and applying the composition to a metal substrate prior to or after forming the metal substrate into a food or beverage container or portion thereof.

In another embodiment, the method includes: forming a composition including: a resin system including a polyester resin and an acrylate resin; a crosslinker selected from the group consisting of a phenolic crosslinker, an amino crosslinker, and combinations thereof; and a catalyst selected from the group consisting of a titanium-containing catalyst, a zirconium-containing catalyst, and combinations thereof; applying the composition to a metal substrate prior to or after forming the metal substrate into a food or beverage container or portion thereof.

In certain embodiments, applying the composition to a metal substrate includes applying the composition to the metal substrate in the form of a planar coil or sheet, hardening the composition, and forming the substrate into a food or beverage container or portion thereof.

DEFINITIONS

As used herein, "acrylate resin" means a resin that includes acrylate and/or methacrylate monomers, oligomers, and/or polymerizable polymers.

As used herein, "(meth)acrylate" is a shorthand reference to acrylate, methacrylate, or combinations thereof, and "(meth)acrylic" is a shorthand reference to acrylic, methacrylic, or combinations thereof.

As used herein, "crosslinker" refers to molecule capable of forming a covalent linkage between polymers or between two different regions of the same polymer.

As used herein, "grafted polyester-acrylate resin" refers to a resin preparation whereby a polyester resin is at least partially grafted to the backbone of an acrylate resin.

As used herein, "phenoplast" refers to phenolic resins which according to the norm DIN ISO 10082 are the condensation products of phenols and aldehydes, usually with formaldehyde. Depending on the choice of reaction conditions, phenolic resins may be self-reactive (thermally or acid reactive) resol resins or non-self-reactive novolak resins.

As used herein, "polybasic acid" refers to an organic acid containing at least two carboxylic acid groups.

As used herein, "polyhydric alcohol" refers to an alcohol containing at least two alcohol groups.

As used herein, the term "substantially free" of a particular mobile compound means that the compositions of the present invention contain less than 1000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

As used herein, the term "mobile" means that the compound can be extracted from the cured coating when a coating (typically, approximate film weight of 1 milligram per square centimeter ($mg/cm^2$)) is exposed to a test medium for some defined set of conditions, depending on the end use. An example of these testing conditions is exposure of the cured coating to 10 weight percent ethanol solution for two hours at 121° C. followed by exposure for 10 days in the solution at 49° C.

If the aforementioned phrases are used without the term "mobile" (e.g., "substantially free of XYZ compound"), then the compositions of the present invention contain less than the aforementioned amount of the compound whether the compound is mobile in the coating or bound to a constituent of the coating.

As used herein, the terms "comprises" and variations thereof do not have a limiting meaning where these terms appear in the description and claims.

As used herein, "a," "an," "the," "at least one," and "one or more" are used interchangeably. Thus, for example, a coating composition that comprises "an" amino crosslinker can be interpreted to mean that the coating composition includes "one or more" amino crosslinkers.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present invention provides a food or beverage container that includes a metal substrate, wherein at least a portion of the metal substrate is coated with a coating prepared from a composition including a resin system, a crosslinker, and a catalyst.

The present invention also provides a method of coating a food or beverage container. The method including: forming a composition described herein; and applying the composition to a metal substrate prior to or after forming the metal substrate into a food or beverage container or portion thereof.

The metal substrate is a metal typically used in the food and beverage packaging industry. Preferably, the metal substrate includes steel, aluminum, or a combination thereof.

The resin system of the present invention can include one or more of the following: carboxylic groups, hydroxyl groups, or oxirane groups.

In certain embodiments, the resin system preferably includes carboxylic groups, hydroxyl groups, or combinations thereof. In certain embodiments, the resin system may also include oxirane groups.

In certain embodiments, the resin system preferably includes oxirane groups and optionally carboxylic groups, hydroxyl groups, or combinations thereof.

Preferably, the resin system is a water-soluble or water-dispersible system.

The resin system preferably includes a polyester resin, an acrylate resin, a grafted polyester-acrylate resin, an epoxy resin, or combinations thereof. More preferably, the resin system includes a polyester resin and an acrylate resin.

In addition to, or in place of, acrylate resins, polyester resins, grafted polyester-acrylate resins, and epoxy resins, other resins include: aliphatic polyisocyanates, for example, those resins commercially available under the trade names RHODOCOAT WT 1000 and TOLONATE D2 (P) (Rhodia CN 7500, Cranbury, N.J.), and DESMODUR BL 3175A (Bayer Material Science AG, D-51368, Leverkusen, Germany). Hydrocarbon resins could also be used, including: coumarone-indene resins, for example, those resins commercially available under the trade name CUMAR R-21 (Neville Chemical Company, Pittsburgh, Pa.); and ethylene co-terpolymer resins, for example, those resins commercially available under the trade name MICHEM Prime 4983 (Michelman Inc., Cincinnati, Ohio).

In certain embodiments, the resin system includes a polyester resin. The polyester resin is preferably the reaction product of components that include (i) a polybasic acid containing at least two carboxyl groups (which can be an anhydride), and (ii) a polyhydric alcohol containing at least two hydroxyl groups.

Examples of suitable polybasic acids containing at least two carboxyl groups include phthalic acid, isophthalic acid, terephthalic acid, tetrahydrophthalic acid, hexahydrophthalic acid, endomethylenetetrahydrophthalic acid, dimethylterephthalate, maleic acid, 2-methyl maleic acid, pyromellitic acid, adipic acid, succinic acid, sebacic acid, glutaric acid, methyleneglutaric acid, glutaconic acid, azelaic acid, aconitic acid, itaconic acid, 2-methyl itaconic acid, sebacic acid, lauric acid, fumaric acid, citraconic acid, 1,2-, 1,3-, or 1,4-cyclohexanedicarboxylic acid, muconic acid, mesaconic acid, camphoric acid, trimellitic acid, tricarballylic acid, tricarboxyethylene, dimethylolpropionic acid, beta-acryloxypropionic acid, derivatives of these such as any possible anhydride of any of these, and any combination of any of these in any proportion. Examples of some suitable anhydrides of the polybasic acid include unsaturated dicarboxylic acid anhydrides, such as maleic anhydride, itaconic anhydride, nonenylsuccinic anhydride, and citraconic anhydride; saturated anhydrides, such as succinic anhydride, phthalic anhydride, and trimellitic anhydride; and any combination of any of these in any proportion.

Examples of suitable polyhydric alcohols containing at least two hydroxyl groups include ethylene glycol, polyethylene glycol, diethylene glycol, triethylene glycol, tetraethylene glycol, hexaethylene glycol, neopentyl glycol, 1,3- and 1,2-propylene glycol, polypropylene glycol, 1,4-butanediol, 1,5-pentanediol, 2,2-dimethylpropanediol, 1,6-hexanediol, 1,2-cyclohexanediol, 1,4-cyclohexanedimethanol, trimethylol propane, pentaerythritol, tricyclodecane dimethanol, glycerol, and any combination of any of these in any proportion.

The polyester(s) may optionally be modified, if desired, by including a fatty acid, such as castor oil fatty acid, coconut oil fatty acid, cotton seed fatty acid, benzoic acid, or any of these in any combination and any proportion along with the polybasic acid that contains at least two carboxyl groups per polybasic acid molecule.

In particularly preferred embodiments, the polyester resin is the reaction product of components that include propylene glycol, trimethylol propane, terephthalic acid, isophthalic acid, and maleic anhydride (preferably prepared in the presence of n-butyltinhydroxideoxide).

Examples of commercially available polyester resins that are suitable for use in coating compositions of the present invention include saturated polyesters available under the trade names DYNAPOL L, LH, and LS (Degussa AG, 45764 Marl, Germany), amorphous copolyesters available under the trade names VYLON GK330 and GK640 (Toyobo Co. Ltd., Osaka 530-8230, Japan), saturated thermoplastic polyesters available under the trade names SYNOLAC 75 NA 64 (medium molecular weight) and SYNOLAC 0691 S 60 (high molecular weight) (both available from Cray Valley, F-92091 Paris La Defense Cedex, France), alkyd type polyester resins, for example, those commercially available under the trade names URALAC AN621 S-2 60 and URALAC AN637 S-2 60 (available from DSM Neoresins BV, 5140 AC Waalwijk, Netherlands), and other polyesters available under the trade names DESMOPHEN T 1665 SN/IB and RUCOTE 552 (both available from Bayer Material Science AG, D-51368, Leverkusen, Germany) as well as URALAC SN800 S2G3-60, URALAC SN852 S2F-60, and URALAC SN859 S2G3-50 (all available from DSM Neoresins BV, 5140 AC Waalwijk, Netherlands).

In certain embodiments, the coating compositions may include one or more polyester resins at a suitable level to produce the desired result. In certain embodiments, one or more polyester resins are present in a total amount of at least 30 weight percent ("wt-%"), based on the total weight of the dry film. In certain embodiments, one or more polyester resins are present in a total amount of no greater than 90 wt-%, in others no greater than 70 wt-%, in others no greater than 60 wt-%, and in others no greater than 50 wt-%, based on the total weight of the dry film.

In certain embodiments, the resin system includes an acrylate resin. The acrylate resin is preferably the reaction product of a composition that includes a (meth)acrylic acid ester, an ethylenically unsaturated mono- or multi-functional acid, and an optional vinyl compound.

Examples of suitable (meth)acrylic acid esters include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-hydroxyethyl (meth)acrylate, 2-ethylhexyl (meth)acrylate, cyclohexyl (meth)acrylate, decyl (meth)acrylate, isodecyl (meth)acrylate, benzyl (meth)acrylate, 2-hydroxypropyl (meth)acrylate, lauryl (meth)acrylate, isobornyl (meth)acrylate, octyl (meth)acrylate, and nonyl (meth)acrylate.

Examples of suitable ethylenically unsaturated mono- or multi-functional acids include methacrylic acid, acrylic acid, crotonic acid, itaconic acid, maleic acid, mesaconic acid, citraconic acid, sorbic acid, and fumaric acid.

Examples of suitable vinyl compounds include styrene, halostyrene, isoprene, a conjugated butadiene, alpha-methylstyrene, vinyl toluene, vinyl naphthalene, vinyl chloride, acrylonitrile, methacrylonitrile, vinyl acetate, vinyl propionate, vinyl cyclohexane, vinyl cyclooctane, vinyl cyclohexene, and vinyl stearate.

Preferably, the acrylate resin is a reaction product of components that include ethyl acrylate, acrylic acid, and styrene (preferably in the presence of 2,2'-azobis(2-methyl-butyronitrile) and tert-butyl peroxybenzoate free radical initiators).

Examples of commercially available acrylate resins that are suitable for coating compositions of the present invention include those available under the trade names VIACRYL SC 454/50BSNB, VIACRYL SC383w/50WA, and VANCRYL 2900 DEV (all from Cytec Industries Inc., West Patterson, N.J.), as well as NEOCRYL A-639, NEOCRYL XK-64, URACON CR203 M3, and URACON CS113 S1G (all from DSM Neoresins BV, 5140 AC Waalwijk, Netherlands).

In certain embodiments, the coating compositions may include one or more acrylate resins at a suitable level to produce the desired result. In certain embodiments, one or more acrylate resins are present in a total amount of at least 5 wt-%, based on the total weight of the dry film. In certain embodiments, one or more acrylate resins are present in a total amount of no greater than 40 wt-%, in others no greater than 30 wt-%, in others no greater than 20 wt-%, and in others no greater than 10 wt-%, based on the total weight of the dry film.

In certain embodiments, the grafted polyester acrylate resin can be prepared from components that include trimethylol propane, terephthalic acid, isophthalic acid, butylhydroxyoxostannane catalyst (available under the trade name FASCAT 9100 from Atofina, Paris, France), maleic anhydride, xylene, butyl glycol, n-butanol, ethyl acrylate, acrylic acid, styrene, 2,2'-azobis(2-methyl-butyronitrile) free radical initiator (available under the trade name VAZO 67 from Du Pont de Nemours, Wilmington, Del.), tert-butyl peroxybenzoate free radical initiator (available under the trade name TRIGONOX from Akzo Nobel, Amem, The Netherlands), dimethylethanolamine, and demineralized water.

In certain embodiments, the grafted polyester acrylate resin can be prepared from trimethylol propane, neopentyl glycol, terephthalic acid, maleic anhydride, phthalic anhydride, ethyl acrylate, acrylic acid, lauric acid, adipic acid, styrene, 2,2'-azobis(2-methyl-butyronitrile) free radical initiator, tert-butyl peroxybenzoate free radical initiator, dimethylethanolamine, and demineralized water.

In certain embodiments, the grafted polyester acrylate resin can be prepared from trimethylol propane, propylene glycol, terephthalic acid, maleic anhydride, isophthalic acid, butyl glycol, ethyl acrylate, acrylic acid, styrene, dimethylaminoethanol, the catalysts 2,2'-azobis(2-methyl-butyronitrile) and tert-butyl peroxybenzoate free radical initiators, and water.

In certain embodiments, the coating compositions may include one or more grafted polyester-acrylate resins at a suitable level to produce the desired result. In certain embodiments, one or more grafted polyester-acrylate resins are present in a total amount of at least 45 wt-%, in other embodiments at least 65 wt-%, and in other embodiments, at least about 75 wt-%, based on the total weight of the dry film. In certain embodiments, one or more grafted polyester-acrylate resins are present in a total amount of no greater than 95 wt-%, and in other embodiments no greater than 85 wt-%, based on the total weight of the dry film.

In certain embodiments, the resin system includes an epoxy resin having one or more oxirane groups. The epoxy resin may be, for example, a polyether diepoxide prepared in a reaction between a dihydric phenol, a compound having one or more epoxy groups, and optionally one or more other suitable compounds. Examples of suitable epoxy resins are disclosed in the copending application entitled "Food and Beverage Containers and Methods of Coating" filed on even date herewith, which is incorporated herein in its entirety.

Preferably, the epoxy resin is Bisphenol A-free. In some embodiments, the epoxy resin is a reaction product of components including a non-Bisphenol A containing dihydric phenols (e.g., bis-4-hydroxy benzoate of 1,4-cyclohexane dimethanol) such as, for example, those described in U.S. Application No. 60/727,734, which is incorporated herein by reference in its entirety.

In certain embodiments, coating compositions may be formulated using one or more curing agents (i.e., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of mobile BPA and aromatic glycidyl ether compounds (e.g., BADGE, BFDGE, and epoxy novalacs).

A wide variety of well known hydroxyl-reactive curing resins can be used. For example, phenolic crosslinkers (e.g., phenoplasts), amino crosslinkers (e.g., aminoplasts), and combinations thereof, may be used.

Phenolic crosslinkers (e.g., phenoplasts) include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, cresylic acid, bisphenol A, and combinations thereof. For certain embodiments, however, the compositions are substantially bisphenol A free. Preferably, the phenolic compound is phenol.

In certain embodiments, the phenolic crosslinker includes at least one phenolic resin, wherein the phenolic resin is the reaction product of a phenolic compound and formaldehyde. Preferably, the phenolic crosslinker has a weight average molecular weight of at least 800 grams/mole, and more preferably at least 1,200 grams/mole. Preferably, the phenolic crosslinker has a weight average molecular weight of no greater than 8,000 grams/mole, and more preferably no greater than 5,000 grams/mole.

Suitable commercially available phenolic crosslinkers may include, for example, that available under the trade name VARCUM 2227 B55 (Reichhold Corporation, Durham, N.C.). VARCUM 2227 B55 phenolic resin solution contains 55 wt-% phenolic resin, based on the total weight of the solution.

In certain embodiments, the coating compositions may include one or more phenolic crosslinkers at a suitable level to produce the desired result. In certain embodiments, one or more phenolic crosslinkers are present in a total amount of at least 1 wt-%, and in others at least 3 wt-%, based on the total weight of the dry film. In certain embodiments, one or more phenolic crosslinkers are present in a total amount of no greater than 10 wt-%, based on the total weight of the dry film.

Amino crosslinker resins (e.g., aminoplasts) are the condensation products of aldehydes, such as formaldehyde, acetaldehyde, crotonaldehyde, and benzaldehyde, with amino or amido group-containing substances, such as urea, melamine, and benzoguanamine. Suitable amino crosslinking resins include, for example, benzoguanamine-formaldehyde resins, melamine-formaldehyde resins, esterified melamine-formaldehyde resins, glycoluril-formaldehyde resins, urea-formaldehyde resins, and combinations thereof. Preferably, the crosslinker employed includes a melamine-formaldehyde resin such as hexamethoxymethyl melamine.

Condensation products of other amines and amides can also be employed, for example, aldehyde condensates of triazines, diazines, triazoles, guanadines, guanamines, and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is most often formaldehyde, other similar condensation products can be made from other aldehydes, such as acetaldehyde, crotonaldehyde, acrolein, benzaldehyde, furfural, glyoxal, and the like.

Suitable commercially available amino crosslinking resins include, for example, those available under the trade names CYMEL 301, 303, 370, 373, and MM100, and RESIMENE 747 (all from Cytec Industries Inc., West Patterson, N.J.); and LUWIPAL 066 (BASF Aktiengesellschaft, 67056 Ludwigshafen, Germany). One specific example of a particularly useful crosslinker is the fully alkylated melamine-formaldehyde resin commercially available under the trade name of CYMEL 303.

In certain embodiments, the coating compositions may include one or more amino crosslinkers at a suitable level to produce the desired result. In certain embodiments, one or more amino crosslinkers are present in a total amount of at least 5 wt-%, based on the weight of total weight of the dry film. In certain embodiments, one or more amino crosslinkers are present in a total amount of no greater than 25 wt-%, and in other embodiments no greater than 18 wt-%, based on the weight of total weight of the dry film.

In certain embodiments, an acid catalyst may be used to help crosslink the phenolic and/or amino crosslinkers, particularly if lower cure temperatures are used. Such acid catalysts include, for example, aromatic sulphonic acid (e.g., 70% in propan-2-ol from Cytec Industries, Inc., West Paterson, N.J.), phosphoric acid, and combinations thereof.

Compositions of the invention further include a catalyst. Preferably, the catalyst includes a titanium-containing catalyst, a zirconium-containing catalyst, or a combination thereof. In certain embodiments, a zirconium-containing catalyst may be preferred (e.g., it may be more efficient such that significantly less catalyst can be used for the same effect).

In certain embodiments, the titanium-containing catalyst is selected from the group consisting of titanium acetylacetonate, tetraalkyltitanates, isopropylorthotitanate, water soluble titanium chelated salts (such as diammonium dihydroxybis[lactato(2)-$O_1O_2$]titanate(2-)), triethanolamine chelates of titanium, tetratriethanolamine chelates of titanium, and combinations thereof. Preferably, the titanium-containing catalyst is diammonium dihydroxybis[lactato(2)-$O_1O_2$]titanate(2-).

Suitable commercially available titanium-containing catalysts may include, for example, those available under the trade names VERTEC IA10, Pl2, TAA, TET, and XL900 (all from Johnson Matthey, Chicago Ill.); and TYZOR 131, LA, TE, and TPT (all from Du Pont de Nemours, Wilmington Del.).

In certain embodiments, the zirconium-containing catalyst is selected from the group consisting of zirconium propionate, zirconium acetate, ammonium zirconyl carbonate, zirconate (2)-bis[carbonato(2)-O]dihydroxy-diammonium, zirconium chelated salts (such as tetrakis [[2,2',2"-nitrilotris (ethanolato)](1)-N,O]zirconium), sodium zirconium lactate, sodium zirconium glycolate, and combinations thereof. More preferably, the zirconium-containing catalyst is ammonium zirconyl carbonate.

Suitable commercially available zirconium-containing catalysts may include, for example, those available under the trade names BACOTE 20 (MEL Chemicals, Manchester, UK); TYZOR 217 and 218, and TEAZ (all from Du Pont de Nemours, Wilmington, Del.).

In certain embodiments, the coating compositions, as disclosed within, may include one or more catalysts at a suitable level to produce the desired result. In certain embodiments, one or more catalysts are present in a total amount of at least 0.03 wt-%, in other embodiments at least 0.05 wt-%, and in others at least 0.06 wt-%, based on the total weight of dry film. In certain embodiments, one or more catalysts are present in a total amount of no greater than 5 wt-%, based on the total weight of dry film.

Preferred compositions are substantially free of mobile quantities of bisphenol A (BPA) and aromatic glycidyl ether compounds (e.g., BADGE, BFDGE, and epoxy novalacs), more preferably essentially free of mobile quantities of these compounds, even more preferably essentially completely free of mobile quantities of these compounds, and most preferably completely free of mobile quantities of these compounds. The coating composition is also preferably substantially free of bound BPA and aromatic glycidyl ether compounds, more preferably essentially free of these compounds, even more preferably essentially completely free of these compounds, and most preferably completely free of these compounds.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom. Preferred optional polymers are substantially free of mobile quantities of BPA and aromatic glycidyl ether compounds (e.g., BADGE, BFDGE and epoxy novalacs).

A coating composition of the present invention may also include other optional ingredients that do not adversely affect the coating composition or a cured coating composition resulting therefrom. Such optional ingredients are typically included in a coating composition to enhance composition aesthetics, to facilitate manufacturing, processing, handling, and application of the composition, and/or to further improve a particular functional property of a coating composition or a cured coating composition resulting therefrom.

Such optional ingredients include, for example, dyes, pigments, toners, extenders, fillers, lubricants, anticorrosion agents, flow control agents, thixotropic agents, dispersing agents, antioxidants, adhesion promoters, light stabilizers, organic solvents, surfactants, and mixtures thereof. Each optional ingredient is included in a sufficient amount to serve its intended purpose, but not in such an amount to adversely affect a coating composition or a cured coating composition resulting therefrom.

One useful optional ingredient is a lubricant (e.g., a wax), which facilitates manufacture of metal closures by imparting lubricity to sheets of coated metal substrate. Preferred lubricants include, for example, Carnauba wax, and polyethylene type lubricants. If used, one or more lubricants can be present in the coating composition in an amount of at least 0.1 wt-%, and in certain embodiments no greater than 2 wt-%, and in other embodiments no greater than 1 wt-%, based on the weight of nonvolatile material.

Another useful optional ingredient is a pigment, such as titanium dioxide. If used, one or more pigments can be present in the coating composition in an amount of no greater than 70 wt-%, and in certain embodiments no greater than 50 wt-%, and in others no greater than 40 wt-%, based on the total weight of solids in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, one or more surfactants can be present in an amount of at least 0.01 wt-%, in certain embodiments at least 0.1 wt-%, based on the weight of resin solids. If used, one or more surfactants can be present in an amount no greater than 10 wt-%, and in certain embodiments no greater than 5 wt-%, based on the weight of resin solids.

As described above, the coating compositions of the present invention are particularly well adapted for use on food and beverage cans (e.g., two-piece cans, three-piece cans, etc.). Two-piece cans are manufactured by joining a can body (typically a drawn metal body) with a can end (typically a drawn metal end). The coatings of the present invention are suitable for use in food or beverage contact situations and may be used on the inside of such cans. They are particularly suitable for spray applied, liquid coatings for the interior of two-piece drawn and ironed beverage cans and coil coatings for beverage can ends. The present invention also offers utility in other applications. These additional applications include, but are not limited to, wash coating, sheet coating, and side seam coatings (e.g., food can side seam coatings).

Spray coating includes the introduction of the coated composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protective coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes." Typical side seam stripes are spray applied and cured quickly via residual heat from the welding operation in addition to a small thermal, ultraviolet, and/or electromagnetic oven.

Preferred coatings of the present invention display one or more of the properties described in the Examples Section. More preferred coatings of the present invention display one or more of the following properties: metal exposure value of less than 3 milliamps (mA) (more preferably, less than 2 mA, and even more preferably less than 1 mA); TNO global extraction results of no greater than 10 milligrams per square decimeter ($mg/dm^2$) (more preferably no greater than 8 $mg/dm^2$, and even more preferably no greater than 5 $mg/dm^2$); adhesion rating of GT0 after water pasteurization; no blush after water pasteurization although (on a rating scale of 0 to 10) at least 7, at least 8, or at least 9 may be acceptable for certain situations; MEK solvent resistance of at least 30 double rubs.

Examples

The following examples are given to illustrate, but not limit, the scope of this invention. Unless otherwise indicated, all parts and percentages are by weight and all molecular weights are weight average molecular weight. Unless otherwise specified, all chemicals used are commercially available from, for example, Sigma-Aldrich (St. Louis, Mo.).

Abbreviations, Descriptions, and Sources of Materials

| | |
|---|---|
| BACOTE 20 | 20% Solution in Water of Ammonium Zirconyl Carbonate |
| AZC | MEL Chemicals (Manchester, UK) |
| n-Butanol | Sigma-Aldrich (St. Louis, MO) |
| Carnauba Wax Emulsion | Michelman 160 PF (25% Wax Emulsion in Water) Michelman Inc. (Cincinnati, OH) |
| CYCAT 600 | Aromatic Sulphonic Acid 70% in Propan-2-ol. Cytec Industries, Inc., (West Patterson, NJ) |
| CYMEL 303 | Hexamethoxymethymelamine Cytec Industries, Inc. (West Patterson, NJ) |
| CYMEL MM100 | Hexamethoxymethymelamine Cytec Industries, Inc. (West Patterson, NJ) |
| Dimethylaminoethanol | Sigma-Aldrich (St. Louis, MO) |
| Epoxy Acrylic Resin Dispersion | Preparation details are given in Example 17 |
| Polyester Acrylic Phenolic Resin | Preparation details are given in Example 1 |
| TYZOR LA LATC | Diammonium dihydroxybis[lactato(2-)-$O_1O_2$]titanate(2-) Du Pont de Nemours (Wilmington DE) |

Test Methods

Initial Metal Exposure for Beverage Can Inside Spray Coatings

This test method determines the amount the inside surface of the can that has not been effectively coated by the sprayed coating. This determination is made through the use of an electrically conductive solution (1% NaCl in deionized water). The coated can is filled with this conductive solution, and an electrical probe is attached in contact to the outside of the can (uncoated, electrically conducting). A second probe is immersed in the salt solution in the middle of the inside of the can. If any uncoated metal is present on the inside of the can, a current is passed between these two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2 mA on average. The results of this test for coatings prepared according to the present invention are presented in Table 5.

Solvent Resistance

The extent of "cure" or crosslinking of a coating is measured as a resistance to solvents, such as methyl ethyl ketone (MEK) or isopropyl alcohol (IPA). This test is performed as described in ASTM D 5402-93. The number of double-rubs (i.e., one back-and-forth motion) is reported. Preferably, the MEK solvent resistance is at least 30 double rubs. The results of this test for coatings prepared according to the present invention are presented in Table 5.

Global Extractions

The global extraction test is designed to estimate the total amount of mobile material that can potentially migrate out of a coating and into food packed in a coated can. Typically, a coated substrate is subjected to water or solvent blends under a variety of conditions to simulate a given end-use. The TNO global migration test is one of a number of Food Approval lacquer homologation tests (devised by the Dutch national laboratory TNO). The TNO global migration test is an extraction test using an acetic acid solution containing 3 wt-% acetic acid and 97 wt-% deionized water, based on the total weight of the acetic acid solution. The acetic acid solution is placed in contact with a coated aluminum panel under the following test conditions: 30 minutes at 100° C. followed by 10 days storage at 40° C. At the end of the 10-day storage period, the acetic acid solution is evaporated and the weight of any remaining extract is weighed. Passage of the TNO global migration test currently requires that the quantity of any remaining extract is 10 mg/dm$^2$ or less of the coated aluminum panel.

Acceptable extraction conditions and media can also be found in 21CFR 175.300 paragraphs (d) and (e). The allowable global extraction limit as defined by the FDA regulation is 50 parts per million (ppm). Details of the FDA test conditions can be found in the FDA publication "Guidelines for Industry" for preparation of Food Contact Notifications.

Preferred coatings give TNO global extraction results of no greater than 10 mg/dm$^2$, more preferred results of no greater than 8 mg/dm$^2$, and even more preferably, the global extraction results are no greater than 5 mg/dm$^2$. The results of this test for coatings prepared according to the present invention are presented in Table 5.

Adhesion

Adhesion testing is performed to assess whether the coating adheres to the coated substrate. The adhesion test was performed either according to ASTM D 3359 or DIN 53151.
(i) ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.
(ii) DIN 53151 (Deutsches Institut für Normung e.V. 10772 Berlin, Germany) using SCOTCH 610 tape. Adhesion is generally rated on a scale of GT0-GT5 where a rating of "GT0" indicates no adhesion failure, a rating of "GT2" indicates 85% of the coating remains adhered, a rating of "GT3" indicates 65-85% of the coating remains adhered, and so on. Adhesion ratings of GT0 are typically desired for commercially viable coatings.

The results of this test for coatings prepared according to the present invention are presented in Tables 3, 4, and 5.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above. The results of this test for coatings prepared according to the present invention are presented in Tables 4 and 5.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization Test. Testing is accomplished by subjecting the substrate to heat ranging from 105-130° C. and pressure ranging from 0.7 kg/cm$^2$ to 1.05 kg/cm$^2$ for a period of 15 minutes to 90 minutes. For the present evaluation, the coated substrate was immersed in deionized water and subjected to heat of 121° C. (250° F.) and pressure of 1.05 kg/cm$^2$ for a period of 90 minutes. The coated substrate was then tested for adhesion and blush as described above. In food or beverage applications requiring retort performance, adhesion ratings of 10 and blush ratings of at least 7 are typically desired for commercially viable coatings. The results of this test for coatings prepared according to the present invention are presented in Tables 4 and 5.

Joy Detergent Test for Beverage Can Inside Spray Coatings

A 1% solution of JOY Detergent (available from Procter & Gamble) in deionized water is prepared and heated to 82° C. (180° F.). Coated panels are immersed in the heated solution for 10 minutes and are then removed, rinsed, and dried. Samples are then evaluated for adhesion and blush, as previously described. Commercially viable beverage interior coatings preferably give adhesion ratings of 10 and blush ratings of at least 7, optimally at least 9, in the detergent test. The results of this test for a coating prepared according to the present invention are presented in Table 5.

Sterilization or Pasteurization

The sterilization or pasteurization test determines how a coating withstands the processing conditions for different types of food products packaged in a container. Typically, a coated substrate is immersed in a water bath and heated for 5 minutes to 60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 10) and blush ratings of at least 5, optimally at least 9. The results of this test for coatings prepared according to the present invention are presented in Tables 3, 4, and 5.

Coating Integrity for Beverage Can Inside Spray Coatings

This test measures the integrity of a coating on a can body after it has been spray applied and cured. It is a measure of the presence or absence of uncoated areas inside the can body. The can body is typically filled with an electrolyte solution and placed on a stand. The electrode is placed in the electrolyte solution and the amount of electrical current that passes through the can body is then measured. If the coating covers the whole of the interior, minimal current will pass through the can body.

For the present evaluation, can bodies were exposed for a period of 4 seconds to an electrolyte solution comprised of 1% NaCl by weight in deionized water. Metal exposure was measured using a WACO Enamel Rater II, available from the Wilkens-Anderson Company, Chicago, Ill., with an output voltage of 6.3 volts. The measured electrical current, in milliamps, is reported. Can bodies were tested initially and then after the can bodies have been subjected to a necking and base reforming fabrication process.

Preferred coatings of the present invention initially pass less than 10 mA when tested as described above, more preferably less than 5 mA, most preferably less than 2 mA, and optimally less than 1 mA. After pasteurization, preferred coatings give continuities of less than 20 mA, more preferably less than 10 mA, even more preferably less than 5 mA, and even more preferably less than 2 mA. The results of this test for a coating prepared according to the present invention are presented in Table 5.

Materials Preparation

Example 1

Preparation of Polyester Acrylic Phenolic Resin

A 2-liter flask was equipped with a stirrer, packed column, condenser, thermocouple, heating mantle and nitrogen blanket. The following were added to the flask: 498.6 grams of propylene glycol, 80.1 grams of trimethylolpropane, 880.1 grams of terephthalic acid, 40.0 grams of isophthalic acid, and 2.0 grams of FASCAT 9100 butylhydroxyoxostannane catalyst (available from Atofina). The flask contents were slowly heated to 225° C. to 235° C. under a nitrogen blanket, and the water from the resulting polycondensation reaction was distilled off. Once the reaction mixture became clear and the temperature at the head of the column dropped, the reaction mixture was cooled to 160° C., and 85.5 grams of isophthalic acid and 16.0 grams of maleic anhydride were added to the flask. The reaction mixture was slowly reheated under a nitrogen blanket to 220° C. to 230° C.

Once the reaction mixture became clear and the temperature at the head of the packed column dropped, the reaction mixture in the flask was cooled to 200° C., the packed column replaced with a Dean & Stark column for azeotropic distillation, and 30.0 grams of xylene were added to the flask. The contents of the flask were reheated under a nitrogen blanket to reflux temperature, and more reaction water was distilled off until the acid number of the reaction mixture fell below 5. The contents of the flask were cooled to 145° C. to 150° C., and 744.6 grams of butyl glycol, 104.7 grams of n-butanol, and 219.6 grams of xylene were then added to form a solution of dissolved Polyester.

A 5-liter flask was equipped with a stirrer, reflux condenser, thermocouple, heating mantle, and nitrogen blanket.

A sample of the solution of dissolved Polyester prepared as described above (1782.0 grams) and butyl glycol (123.0 grams) were placed in the 5-liter flask and preheated under nitrogen blanket to 120° C. In a separate flask, 321.0 grams of ethyl acrylate, 68.3 grams of glacial acrylic acid, 96.1 grams of styrene and 11.9 grams of VAZO 67 free radical initiator (2,2'-azobis(2-methyl-butyronitrile, available from Du Pont de Nemours, Wilmington, Del.) were premixed. The mixture of monomers and initiator was then added to the polyester solution over a period of 135 minutes under a nitrogen blanket and at a temperature of 120° C.-122° C. The temperature in the 5-liter flask was then maintained for 1 hour at 122° C.

Following this, 2.6 grams of TRIGONOX C free radical initiator (tert-butyl peroxybenzoate, available from Akzo Nobel) were added to the 5-liter flask, and the reactor temperature was maintained for 2 hours at 122° C. The reaction mixture was then cooled to 105° C., and a premix containing 150.3 grams of dimethylethanolamine and 150.3 grains of demineralized water was added to the 5-liter flask over a 10-minute period, followed by a hold of 10 minutes. The reaction mixture dropped in temperature to 90° C. at the end of the addition. Finally, 2554 grams of water were added to the 5-liter flask over a 30-minute period, and the solution of the polyester acrylate inverted into an aqueous dispersion of the Polyester Acrylate. A 60% solution of VARCUM 2227 phenolic resin (211 grams) (Reichhold Corporation, Durham, N.C.) was incorporated in the inverted polyester acrylate resin that was at a temperature of about 60° C. after the final water addition to the polyester acrylate resin had been completed. This VARCUM 2227 resin addition was followed by a hold of 20 minutes.

The aqueous dispersion of Polyester Acrylate Phenolic contained 29.8 wt-% solids (nonvolatile matter), based on the total weight of the aqueous dispersion of Polyester Acrylate Phenolic, as determined by heating a 1-gram sample of the aqueous dispersion of Polyester Acrylate Phenolic for 60 minutes at a temperature of 150° C. The aqueous dispersion of the Polyester Acrylate Phenolic had a pH of 8.53 standard pH units at a temperature of about 20° C.

Example 2

Preparation of Epoxy-Free Inside Spray

To 70.43 parts of polyester acrylic phenolic resin as prepared in Example 1 under stirring were added 14.40 parts deionized water and a premix consisting of 0.022 part CYCAT 600 aromatic sulphonic acid, 10.75 parts n-butanol, and 2.57 part CYMEL 303 hexamethoxymethymelamine. To the resulting composition under stirring was added 0.17 parts Carnauba Wax emulsion and 0.65 part BACOTE 20 AZC (diluted 10% in water). The resulting product is suitable for spray application on the interior of beer and beverage cans and crosslinks at high temperature.

Examples 3-10

Preparation of Epoxy-Free Inside Spray

Using the same general procedure described above in Example 2 the following formulation variables were prepared, as summarized in Table 1.

TABLE 1

| Material | Ex. 3 | Ex. 4 | Ex. 5 | Ex. 6 | Ex. 7 | Ex. 8 | Ex. 9 | Ex. 10 |
|---|---|---|---|---|---|---|---|---|
| Polyester acrylic phenolic resin (Example 1) parts (wt-%) | 143.6 (67.323) | 143.6 (71.525) | 143.6 (1.98) | 143.6 (69.16) | 143.6 (68.57) | 143.6 (71.94) | 143.6 (69.02) | 143.6 (69.46) |
| CYMEL 303 parts (wt-%) | 5.2 (2.438) | 5.2 (2.614) | | | | | | |
| BACOTE 20 parts (wt-%) | | 5.0 (2.471) | | | | | | |
| CYMEL MM100 parts (wt-%) | | | 5.2 (2.61) | 5.2 (2.50) | 5.2 (2.48) | 5.2 (2.61) | 5.2 (2.50) | 5.2 (2.52) |
| TYZOR LA parts (wt-%) | | | 8.8 (4.43) | 1.8 (0.85) | 3.5 (1.69) | 4.4 (2.21) | 2.2 (1.06) | 0.9 (0.43) |
| n-Butanol parts (wt-%) | 8.4 (3.938) | 16.0 (7.949) | 16.0 (8.00) | 16.0 (7.69) | 16.0 (7.62) | 16.0 (8.00) | 16.0 (7.67) | 16.0 (7.72) |
| Deionized water parts (wt-%) | 54.5 (25.551) | 25.5 (12.70) | 21.5 (10.78) | 39.5 (19.03) | 39.5 (18.87) | 25.5 (12.7) | 39.5 (18.9) | 39.5 (19.11) |
| Deionized water parts (wt-%) | | 3.9 (1.943) | 2.8 (1.40) | | | | 3.3 (1.67) | |
| CYCAT | 1.6 | 1.6 | 1.6 | 1.6 | 1.6 | 1.6 | 1.6 | 1.6 |

TABLE 1-continued

| Material | Ex. 3 | Ex. 4 | Ex. 5 | Ex. 6 | Ex. 7 | Ex. 8 | Ex. 9 | Ex. 10 |
|---|---|---|---|---|---|---|---|---|
| 600 parts (wt-%) | (0.750) | (0.797) | (0.80) | (0.77) | (0.76) | (0.80) | (0.77) | (0.77) |
| Total = parts (wt-%) | 213.3 (100) | 200.8 (100) | 199.5 (100) | 207.64 (100) | 209.4 (100) | 199.61 (100) | 208.07 (100) | 206.8 (100) |

Examples 11-16

Preparation of Epoxy-Free Inside Spray

In these examples a simple blending procedure of the two formulations described as Example 3 and Example 4 was done.

The experimental formulations for the Preparation of Examples 11-16 are summarized in Table 2.

TABLE 2

| Example | Example 3 Formulation (g) | Example 4 Formulation (g) |
|---|---|---|
| 11 | 50 | 50 |
| 12 | 75 | 25 |
| 13 | 87.5 | 12.5 |
| 14 | 93.8 | 6.25 |
| 15 | 96.9 | 3.125 |
| 16 | 98.9 | 1.0625 |

Example 17

Preparation of Epoxy Acrylic Resin Dispersion

A 5-liter flask was equipped with a stirrer, reflux condenser, thermocouple, heating mantle, and nitrogen blanket. Low molecular weight liquid epoxy and bisphenol A were charged to the reactor plus butyl tri-phenyl phosphonium bromide catalyst and xylene. A Nitrogen purge was carried out and heat was applied initially, after which an exotherm raised the temperature in the reactor. A target weight per epoxy value of around 2900-3100 was achieved in a typical reaction time of 6 hours. Butyl glycol, n-butanol, and amyl alcohol solvents were then added slowly over a 90-minute period. Acrylic monomers styrene, and methacrylic acid plus benzoyl peroxide initiator LUCIDOL 78 (available from Akzo Nobel, Arnem, The Netherlands) were then added to a monomer addition tank. After stirring, the acid number of this monomers/catalyst pre-mix was checked. The monomers/catalyst were then slowly added to the hot epoxy solution and the acrylic polymerization took place. The epoxy acrylic resin solution was then cooled and discharged from the reactor into a thinning tank containing a solution of water and diaminoethanolamine. The epoxy acrylic solution formed a dispersion in the water by inversion.

Example 18

Preparation of Epoxy-Acrylate Inside Spray

To 76.02 parts epoxy acrylic resin dispersion as prepared in Example 17 was added with stirring, 18.82 parts deionized water, 3.68 parts n-butanol, and a premix consisting of 0.25 parts dimethylaminoethanol and 1.23 parts deionized water. The resulting product was suitable for spray application on the interior of beer and beverage cans and crosslinked at high temperature.

Example 19

Formulation of Acidified Copper Sulfate Solution Used in the Wedge Bend Test

The test solution was prepared by combining 20 parts of $CuSO_4 \cdot 5(H_2O)$, 70 parts of deionized water, and 10 parts of hydrochloric acid (36%).

Example 20

Effect of Catalyst on Epoxy-Free Polyester Acrylic Inside Spray

Figure 1:
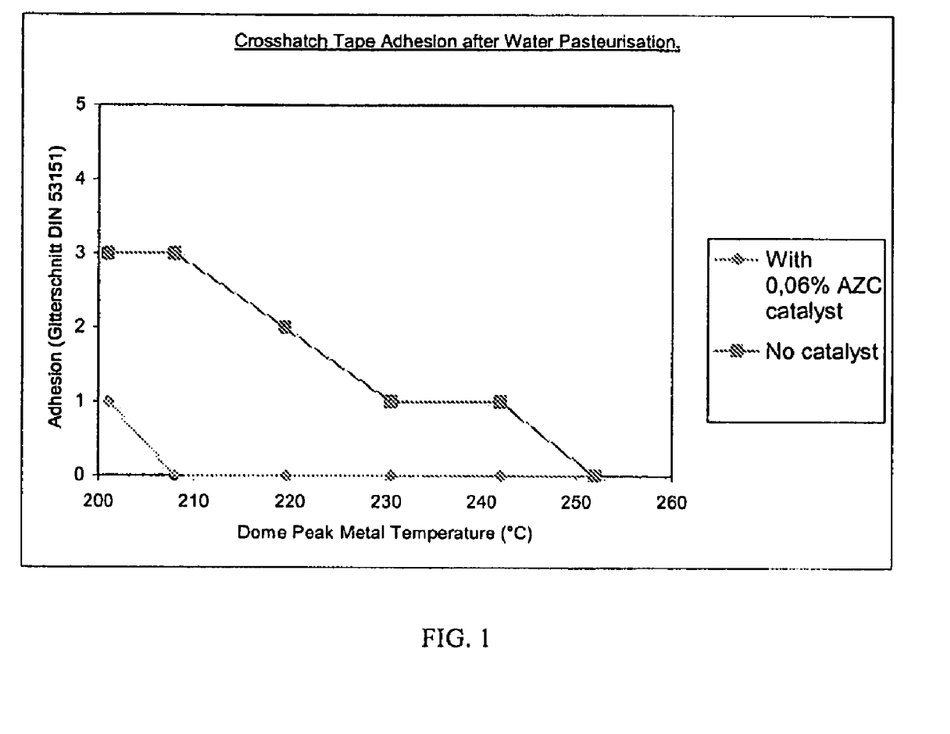
FIG. 1 is a representation of the results of the crosshatch tape adhesion test after water pasteurization.

Aluminum beverage test cans (33 cl.) were sprayed internally with the coating formulation from Example 2 and cured at a range of 200-260° C. (temperature measured by a thermocouple placed on the metal dome of the can) for 3.5 minutes. The cans were pasteurized in tap water at 85° C. for 30 minutes (to simulate for example a beer filling pasteurization process). After pasteurization, a crosshatch tape adhesion test was carried out in accordance with the German DIN norm 53151 (Deutsches Institut für Normung e.V. 10772 Berlin, Germany) to assess the adhesion on a scale of 0 (100% adhesion) to 5.0 (0% adhesion). FIG. 1 illustrates typical adhesion results achieved for a polyester acrylic epoxy-free coating with and without the catalyst BACOTE 20.

Excellent adhesion was achieved without the catalysts at the highest cure temperature range of 250-260° C.; but, this is above typical beverage can lacquer application production line oven conditions with dome metal temperatures of 200-230° C.

Example 21

Effect of Higher Cure Temperatures on Coating Flexibility

Figure 2:
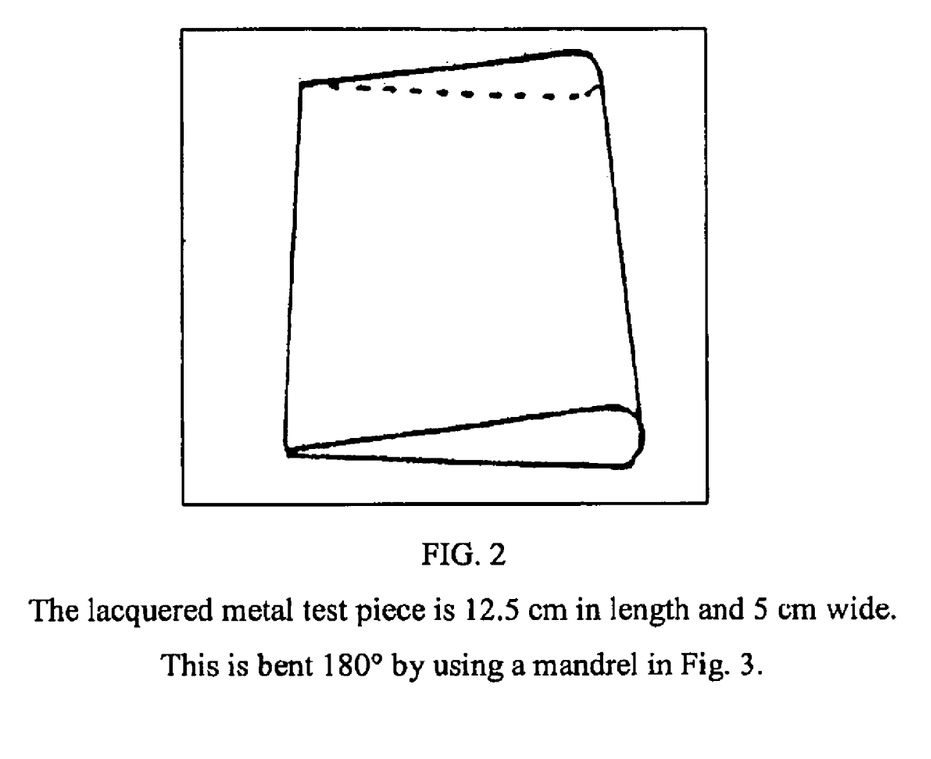
FIG. 2 is a representation of the lacquered metal test piece.
Figure 3:
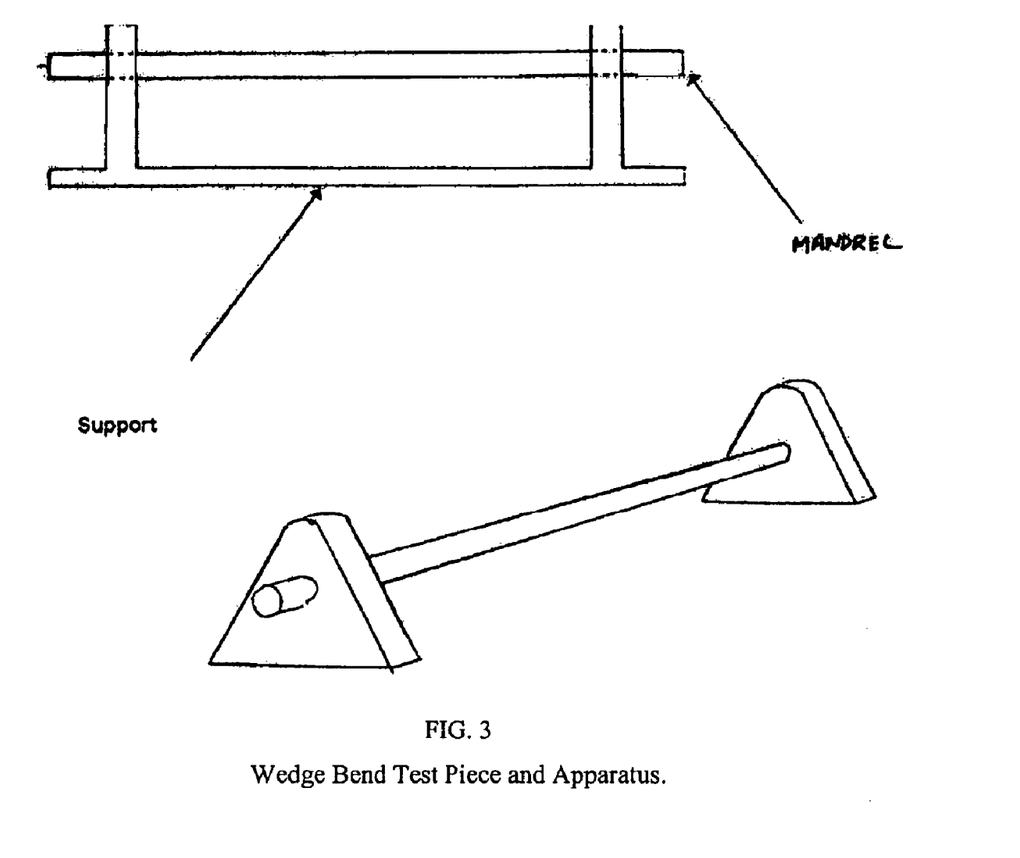
FIG. 3 is a representation of the apparatus used to form a test wedge.
Figure 4:
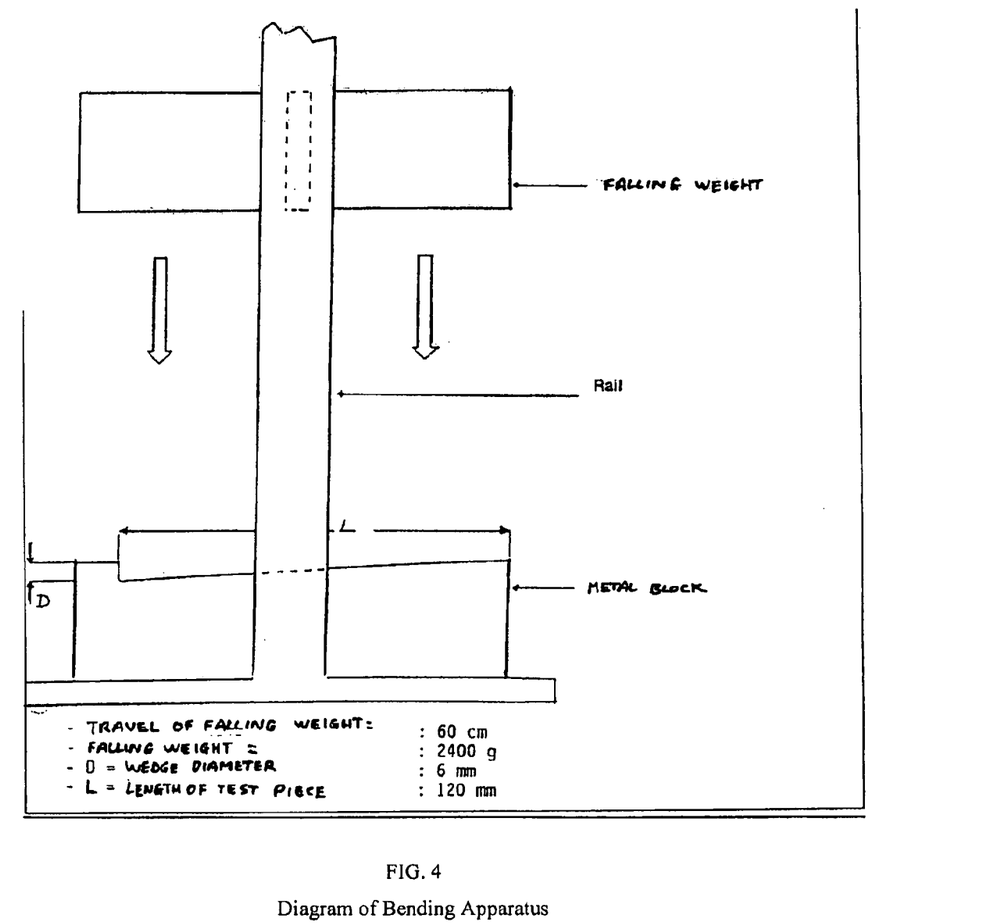
FIG. 4 is a representation of the bending apparatus.

A can with the polyester acrylic epoxy-free coating as prepared in Example 20 was cut open and the sidewall is cut into a 5 centimeter (cm) by 12.5 cm oblong section. A test wedge (e.g., FIG. 2) was formed by dropping a 2.4 kg weight onto the sample place on a mandrel (e.g., FIG. 3) in a bending apparatus (e.g., FIG. 4). The test wedge was immersed in the copper sulphate solution as prepared in Example 19 for about 2 minutes. The exposed metal was examined under a microscope and measured in millimeters of failure.

Figure 5:
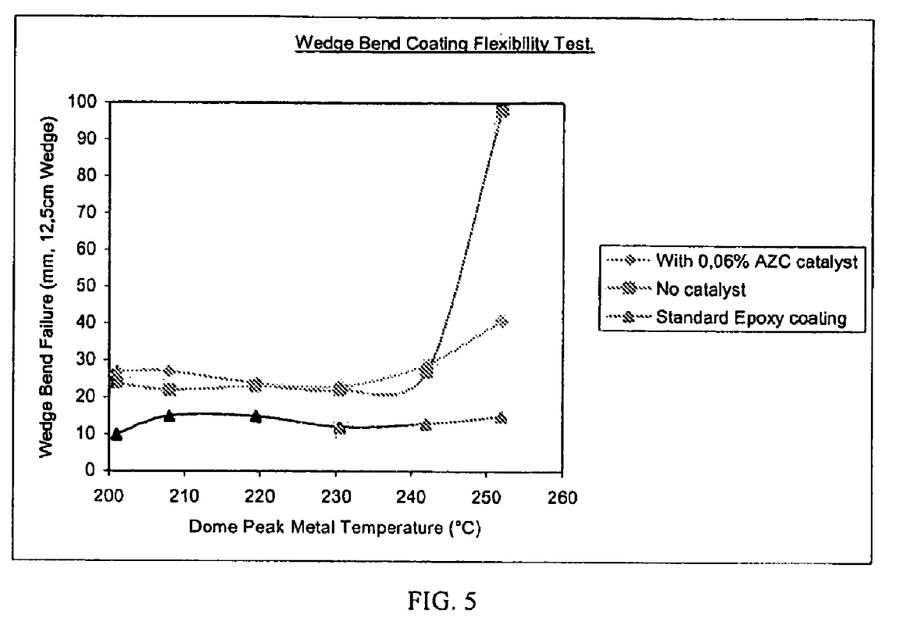
FIG. 5 is a representation of the results of the wedge bend coating flexibility test.

FIG. 5 reveals a total failure of flexibility of the coating above 240° C. in the absence of catalyst. However, the presence of the BACOTE 20 catalyst improved the flexibility of the coating. This graph illustrates that excellent adhesion can be achieved by curing a formulation without catalyst at a very high temperature; however, this reduced the flexibility of the coating.

Examples 22-35

Effect of Catalyst on Coating Flexibility

These materials were subjected to the water pasteurization adhesion test described herein above. The results are shown in Table 3.

The composition of Example 29, which was prepared in a manner similar to that of Example 2, is as follows:

| | Example 29 | % wt | Dry film % wt |
|---|---|---|---|
| Example 1 | Polyester/acrylic/phenolic resin | 68.55 | 88.0 |
| | CYMEL 303 | 2.51 | 11.6 |
| | amyl alcohol | 1.96 | |
| | n-butanol | 4.70 | |
| | Deionized water | 22.20 | |
| | CYCAT 600 | 0.08 | 0.36 |
| | Total = | 100.0 | 100.0 |

After adding the LATC catalyst, a distinctive bright yellow color developed by the water based polyester acrylic coating formulation (which also contains both phenolic and melamine cross-linking resins). Experiments have shown that the yellow color is a result of an interaction between the LATC and the phenolic resin dispersion. This result was obtained by the simple expedient of removing each component of the coating formulation in turn until the interaction with the phenolic resin dispersion was identified by elimination. No interaction was found with the melamine resin.

Since no such coloration occurred when using the AZC catalyst, it is speculated that a different mechanism may be involved in the adhesion improvement. The AZC catalyst is more efficient by a factor of ten.

Examples 36-39

Effect of Cure Temperature on Blush and Adhesion

Samples of Examples 36-38 were sterilized for 90 minutes at 121° C. in an autoclave. The blush and adhesion results are shown in Table 4. Blush is film whitening with a scale of 0 (poor) to 10 (excellent).

TABLE 3

Water Pasteurization Adhesion Test

| | | % Additive | Dome Temperature | | | | | |
|---|---|---|---|---|---|---|---|---|
| Example | Catalyst | (wt/wt Solids) | 201° C. | 208° C. | 210.5° C. | 230.5° C. | 242° C. | 252° C. |
| 22 (Composition of Ex. 4) | AZC | 2 | GT0 | GT0 | GT0 | GT0 | GT0 | GT0 |
| 23 (Composition of Ex. 11) | AZC | 1 | GT0 | GT0 | GT0 | GT0 | GT0 | GT0 |
| 24 (Composition of Ex. 12) | AZC | 0.5 | GT0 | GT0 | GT0 | GT0 | GT0 | GT0 |
| 25 (Composition of Ex. 13) | AZC | 0.25 | GT0 | GT0 | GT0 | GT0 | GT0 | GT0 |
| 26 (Composition of Ex. 14) | AZC | 0.125 | GT0 | GT0 | GT0 | GT0 | GT0 | GT0 |
| 27 (Composition of Ex. 15) | AZC | 0.06 | GT0 | GT0 | GT0 | GT0 | GT0 | GT0 |
| 28 (Composition of Ex. 16) | AZC | 0.03 | GT2 | GT3 | GT0 | GT0 | GT0 | GT0 |
| 29 | None | 0 | GT3 | GT3 | GT2 | GT1 | GT1 | GT0 |
| 30 (Composition of Ex. 7) | LATC | 4% | GT0 | GT0 | GT0 | GT0 | GT0 | GT0 |
| 31 (Composition of Ex. 6) | LATC | 2% | GT0 | GT0 | GT0 | GT0 | GT0 | GT0 |
| 32 (Composition of Ex. 5) | LATC | 1% | GT0 | GT0 | GT0 | GT0 | GT0 | GT0 |
| 33 (Composition of Ex. 8) | LATC | 0.5% | GT1 | GT0 | GT0 | GT0 | GT0 | GT0 |
| 34 (Composition of Ex. 9) | LATC | 0.25% | GT5 | GT4 | NA | GT0 | GT0 | GT0 |
| 35 (Composition of Ex. 10) | LATC | 0.1% | GT5 | GT5 | NA | GT0 | GT0 | GT0 |

TABLE 4

Water Sterilization Test Results

| Example | Catalyst | % Additive (wt/wt Solids) | Dome Metal Temperature(° C.) | Blush | Adhesion Dome | Adhesion Sidewall |
|---|---|---|---|---|---|---|
| 36 (Composition of Ex. 29) | None | 0 | 201 | 6 | GT3 | GT0 |
| | | | 208 | 7 | GT2 | GT0 |
| | | | 219.5 | 10 | GT0 | GT0 |
| | | | 230.5 | 9 | GT0 | GT0 |
| | | | 242 | 10 | GT0 | GT0 |
| | | | 252 | 10 | GT0 | GT0 |
| 37 (Composition Of Ex. 8) | LATC | 0.5 | 201 | 6 | GT2 | GT0 |
| | | | 208 | 8 | GT0 | GT0 |
| | | | 219.5 | 8 | GT0 | GT0 |
| | | | 230.5 | 10 | GT0 | GT0 |
| | | | 242 | 10 | GT0 | GT0 |
| | | | 252 | 10 | GT0 | GT0 |
| 38 (Composition of Ex. 15) | AZC | 0.06 | 201 | 5 | GT0 | GT0 |
| | | | 208 | 6 | GT0 | GT0 |
| | | | 219.5 | 7 | GT0 | GT0 |
| | | | 230.5 | 8 | GT0 | GT0 |
| | | | 242 | 9 | GT0 | GT0 |
| | | | 252 | 10 | GT0 | GT0 |

The composition of Example 39 was prepared in a similar manner to that described in Example 3, but with a slightly higher amino resin content and slight changes in catalyst quantity as follows:

| | Example 39 | % wt | Dry film % wt |
|---|---|---|---|
| Example 1 | Polyester/acrylic/phenolic resin | 66.80 | 82.4 |
| | CYMEL 303 | 3.86 | 17.2 |
| | Bacote 20 | 0.28 | 0.25 |
| | n-butanol | 10.98 | |
| | Deionized water | 17.90 | |
| | Carnauba wax emulsion | 0.17 | 0.09 |
| | CYCAT 600 | 0.01 | 0.01 |
| | Total = | 100.0 | 100.0 |

Samples of Examples 18 and 39 were sterilized for 90 minutes at 121° C. in an autoclave. The blush and adhesion results are shown in Table 5.

TABLE 5

Summary of Test Results

| Results Table | Epoxy acrylate coating (Example 18) | | Polyester acrylate coating (Example 19) | |
|---|---|---|---|---|
| | Blush | Adhesion | Blush | Adhesion |
| Water pasteurization (30 mins @ 82° C.) | No blush | GT0 | No blush | GT0 |
| Beer pasteurization (30 mins @ 82° C.) | No blush | GT0 | No blush | GT0 |
| Joy pasteurization test (30 mins @ 82° C.) | No blush | GT0 | No blush | GT0 |
| TNO migration test Test limit 10 mg/dm² | Pass 5 mg/dm² | | Pass 5 mg/dm² | |
| Enamel Ratings Before can necking After necking and base reforming | Spray applied cans 0.3 Ma 0.3 mA | | Spray applied cans 0.3 mA 0.4 mA | |
| Solvent Resistance (MEK double rubs) | >100 rubs | | >100 rubs | |
| Mineral Water Flavor Room Temp. Storage (1 week) | Positive No off-flavors | | Positive No off-flavors. | |
| Diet Cola pack test 12 months @ Room Temp. Alu pick-up (ppm) | 0.5 | | 2.1 | |
| Beer pack test 12 months @ Room Temp. Alu pick-up (ppm) | 0.1 | | 0.1 | |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A food or beverage container comprising a metal substrate, wherein at least a portion of the metal substrate is coated with a coating prepared from a composition comprising:
   a resin system comprising carboxylic groups, hydroxyl groups, or combinations thereof;
   a crosslinker comprising a phenolic crosslinker, an amino crosslinker, or a combination thereof; and
   a catalyst comprising a titanium-containing catalyst, a zirconium-containing catalyst, or a combination thereof;
   wherein the composition is substantially Bisphenol A-free.

2. The container of claim 1, wherein the resin system includes a polyester resin and an acrylate resin.

3. The container of claim 1, wherein the resin system further comprises oxirane groups.

4. The container of claim 1, wherein the resin system is a water-soluble or water-dispersible system.

5. The container of claim 4, wherein the resin system comprises a polyester resin, an acrylate resin, a grafted polyester-acrylate resin, or combinations thereof.

6. The container of claim 1, wherein the crosslinker comprises a phenolic crosslinker.

7. The container of claim 6, wherein the phenolic crosslinker has a weight average molecular weight of 800 to 8,000.

8. The container of claim 6, wherein the phenolic crosslinker comprises a reaction product of components including phenol, cresol, p-phenylphenol, p-tert-butylphenol, p-tert-amylphenol, cyclopentylphenol, cresylic acid, or a combination thereof.

9. The container of claim 6, wherein the phenolic crosslinker comprises a reaction product of components including phenol.

10. The container of claim 1, wherein the crosslinker comprises an amino crosslinker.

11. The container of claim 10, wherein the amino crosslinker is selected from benzoguanamine-formaldehyde resins, melamine-formaldehyde resins, esterified melamine-formaldehyde resins, glycoluril-formaldehyde resins, urea-formadehyde resins, or a combination thereof.

12. The container of claim 10, wherein the amino crosslinker comprises a fully methylated hexamethoxymethyl melamine resin.

13. The container of claim 1, wherein the catalyst comprises a titanium-containing catalyst.

14. The container of claim 13, wherein the titanium-containing catalyst is selected from a titanium acetylacetonate, tetraalkyltitanates, isopropylorthotitanate, water soluble titanium chelated salts, triethanolamine chelates of titanium, tetratriethanolamine chelates of titanium, diammonium dihydroxybis[lactato(2)-$O_1O_2$]titanate(2-), or a combination thereof.

15. The container of claim 13, wherein the titanium-containing catalyst is diammonium dihydroxybis[lactato(2)-$O_1O_2$]titanate(2-).

16. The container of claim 1, wherein the catalyst comprises a zirconium-containing catalyst.

17. The container of claim 16, wherein the zirconium-containing catalyst is selected from zirconium propionate, zirconium acetate, ammonium zirconyl carbonate, zirconate (2)-bis[carbonato(2)-O]dihydroxy-diammonium, zirconium chelated salts, sodium zirconium lactate, sodium zirconium glycolate, tetrakis [[2,2',2"-nitrilotris(ethanolato)](1)-N,O] zirconium, or a combination thereof.

18. A method of coating a food or beverage container, the method comprising:
   forming a composition comprising:
      a resin system comprising carboxylic groups, hydroxyl groups, or combinations thereof;
      a crosslinker comprising a phenolic crosslinker, an amino crosslinker, or a combination thereof; and
      a catalyst comprising a titanium-containing catalyst, a zirconium-containing catalyst, or a combination thereof;
      wherein the composition is substantially Bisphenol A-free; and
   applying the composition to a metal substrate prior to or after forming the metal substrate into a food or beverage container or portion thereof.

19. The method of claim 18, wherein applying the composition to a metal substrate comprises applying the composition to the metal substrate in the form of a planar coil or sheet, hardening the composition, and forming the substrate into a food or beverage container or portion thereof.

20. A food or beverage container comprising a metal substrate, wherein at least a portion of the metal substrate is coated with a coating prepared from a composition comprising:
   a resin system comprising oxirane groups and optionally carboxylic groups, hydroxyl groups, or combinations thereof;
   a crosslinker comprising a phenolic crosslinker, an amino crosslinker, or a combination thereof; and
   a catalyst comprising a titanium-containing catalyst, a zirconium-containing catalyst, or a combination thereof.

* * * * *